United States Patent [19]

Nanstiel et al.

[11] 4,366,617

[45] Jan. 4, 1983

[54] PLUG REMOVAL APPARATUS

[75] Inventors: William F. Nanstiel, Forest Hills; Ronald F. Antol, North Huntingdon, both of Pa.

[73] Assignee: Westinghouse Electric Corp., Pittsburgh, Pa.

[21] Appl. No.: 129,538

[22] Filed: Mar. 12, 1980

[51] Int. Cl.³ .............................................. B23P 15/26
[52] U.S. Cl. ........................................ 29/727; 29/252
[58] Field of Search ............... 29/726, 426.5, 235, 29/252, 426.6, 727

[56] References Cited

U.S. PATENT DOCUMENTS 3,504,420  4/1970  Shores ................................ 29/235
3,786,550  1/1974  Jones ............................... 29/252 X
4,095,335  1/1978  Lassarat ............................. 29/726
4,213,239  7/1980  Filer ................................. 29/726

Primary Examiner—Jimmy C. Peters
Attorney, Agent, or Firm—L. A. De Paul; Z. L. Dermer

[57] ABSTRACT

The plug removal apparatus comprises a ram mounted in a rod both of which are mounted in an activating cylinder. The rod is capable of being scrwed into the plug such that when the cylinder is activated, the cylinder causes the ram to push the expander relative to the plug while the rod holds the plug thereby relieving the pressure on the plug. The activating cylinder may then be activated so as to extract the plug from the tube using short strokes. The apparatus is capable of being used manually or remotely so as to be able to remove plugs from heat exchangers and nuclear steam generators.

8 Claims, 9 Drawing Figures

PLUG REMOVAL APPARATUS

BACKGROUND OF THE INVENTION

This invention relates to plug removal apparatus and more particularly to apparatus for removing plugs from heat exchanger tubes.

In tube type heat exchangers, a first fluid flows through the tubes of the heat exchanger while a second fluid surrounds the outside of the tubes such that heat exchange occurs between the two fluids. Occasionally, one of the tubes can become defective such that a leak occurs therein which allows the two fluids to mingle. When this occurs, it is sometimes necessary to plug the tube so that the fluid does not flow through the tube thereby preventing leakage from the tube.

In nuclear reactor power plants, the tube type heat exchangers are commonly referred to as steam generators. When a defect occurs in the tubes of the nuclear steam generator that allows the coolant in the tubes to mingle with the coolant outside of the tubes, a more significant problem arises. Not only does this situation create an ineffective heat exchanger, but it also creates a radioactive contamination problem. Since the fluid flowing in the tubes of a nuclear steam generator is generally radioactive, it is important that it not be allowed to leak from the tubes and contaminate the fluid surrounding the tubes. Therefore, when a leak occurs in a nuclear steam generator heat exchange tube, the heat exchange tube is plugged so that the coolant is not permitted to flow through the tube. This prevents contamination of the fluid surrounding the tubes.

There are several kinds of plugs that may be used to plug the heat exchange tubes. One such device used to plug heat exchange tubes in nuclear reactors is an explosive plugging device. With the explosive plugging devices, a metal plug is inserted in the heat exchange tube with an explosive contained within the plug. When the explosive is detonated, the plug is forced into close contact with the inside of the tube thus blocking flow through the tube. One problem associated with explosive plugging is that should it become necessary to replace the defective tube or a defective plug, the explosive plug must be drilled out which is a time consuming procedure.

Another device used to plug heat exchange tubes is generally referred to as a mechanical plug. The mechanical plug comprises a cylindrical member closed at one end and having a tapered inner bore. An expander member is disposed in the cylindrical member such that when the expander member is drawn along the longitudinal axis of the cylindrical member, the cylindrical member is forced into close contact with the heat exchange tube due to the relative tapers of the inner surface of the cylindrical member and the expander member. In this type of device, no explosives are necessary to create the close contact between the plug and the heat exchange tube. Rather, the expansion of the plug is caused by the relative movement of the expander member in the plug. This gives the mechanical plug the characteristic of being able to be removed without being drilled out. In order to remove the mechanical plug, it is, thus, first desirable to relieve the internal pressure on the plug by moving the expander member to a position in the plug in which the tapered diameters of the plug and expander member are not in contact. Next, with the pressure on the plug relieved, the plug may then be pulled from the heat exchange tube.

In order to quickly remove the mechanical plug from the heat exchange tube, it would be desirable to have a mechanism that is capable of both relieving the pressure on the plug and pulling the plug from the heat exchange tube. Therefore, what is needed is apparatus that is capable of quickly relieving the pressure on the plug so as to loosen the plug in the heat exchange tube and that is capable of extracting the plug from the heat exchange tube.

SUMMARY OF THE INVENTION

The plug removal apparatus comprises a ram mounted in a rod both of which are mounted in an activating cylinder. The rod is capable of being screwed into the plug such that when the cylinder is activated, the cylinder causes the ram to push the expander relative to the plug while the rod holds the plug thereby relieving the expansive pressure on the plug. The activating cylinder may then be activated so as to extract the plug from the tube using short strokes. The apparatus is capable of being used manually or remotely so as to be able to remove plugs from heat exchangers and nuclear steam generators.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

It is sometimes necessary to remove a mechanical plug from a heat exchange tube. The invention described herein provides plug removal apparatus for effectively removing a mechanical tube plug from a heat exchange tube.

Figure 1:
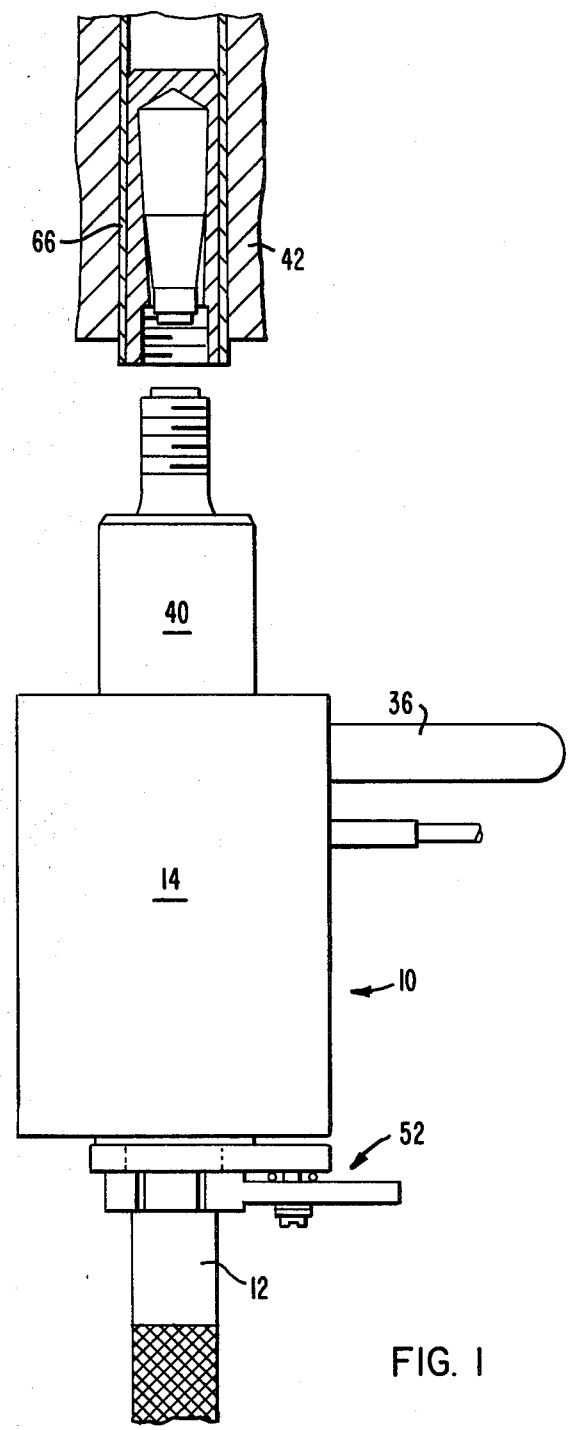
FIG. 1 is a view in elevation of the plug removal apparatus.
Figure 2:
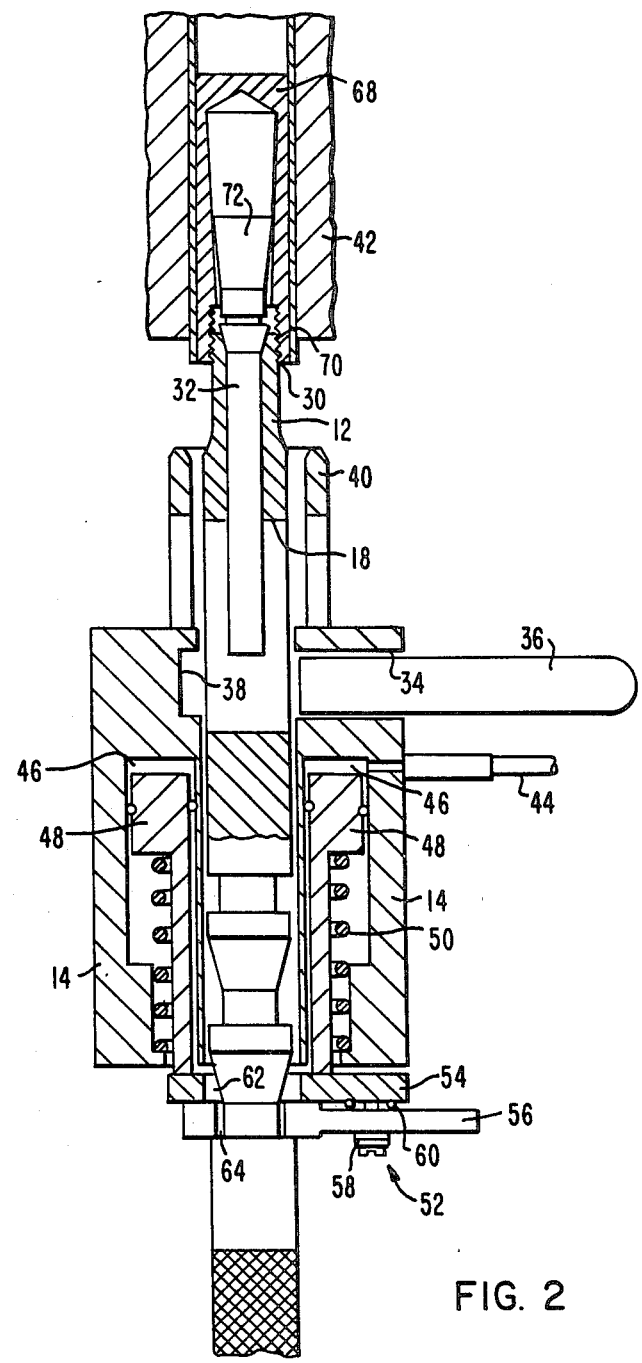
FIG. 2 is a cross-sectional view of the plug removal apparatus.
Figure 3:
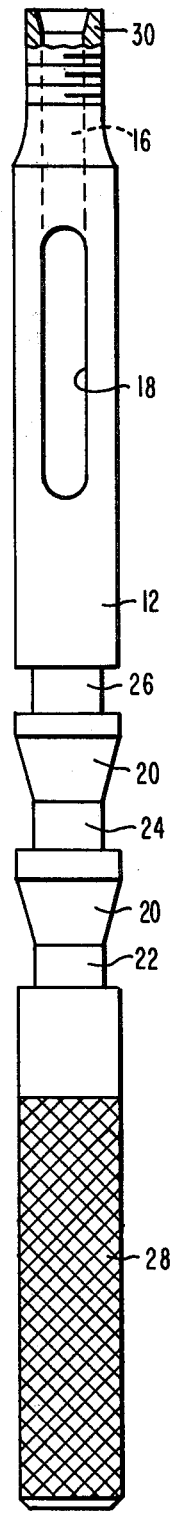
FIG. 3 is a view of the rod.

Referring to FIGS. 1-3, the plug removal apparatus which is referred to generally as 10 comprises a rod 12 disposed in activating cylinder 14. Rod 12 is a generally cylindrical metal member having a bore 16 extending from the top end and through a portion of rod 12. Rod 12 also has a slot 18 therein that extends the entire width of rod 12 and through a portion of bore 16. Rod 12 also has a plurality of camming surfaces 20 which are separated by a first notch 22, a second notch 24, and a third notch 26. The bottom end of rod 12 is formed into a handle 28 which may be used for manual manipulation while the top end of rod 12 has first threads 30 along the outer circumference thereof for engaging threads on the inside of the plug to be removed. A metal ram 32 is disposed in bore 16 and has a top portion thereof that is flared so as to rest on the outer edge of bore 16 while ram 32 extends into slot 18.

Still referring to FIGS. 1-3, activating cylinder 14 has an opening 34 therein through which bar 36 extends. Bar 36 is capable of being moved through opening 34 and lodging in groove 38 of activating cylinder 14. Bar 36 is also capable of passing through slot 18 in rod 12 so as to be able to contact ram 32. Activating cylinder 14 also has a spacer 40 mounted on the top end thereof for maintaining activating cylinder 14 a set distance from tubesheet 42. A fluid line 44 is connected to activating cylinder 14 for conducting a fluid to and from annular chamber 46 defined within activating cylinder 14. A piston member 48 is disposed in annular chamber 46 and is arranged such that a biasing mechanism such as a first spring 50 can be located between piston member 48 and activating cylinder 14. Piston member 48 is slidably disposed within annular chamber 46 and is capable of compressing first spring 50 when annular chamber 46 is pressurized to approximately 3,000–7,500 psi by fluid introduced through fluid line 44. First spring 50 which may be a compression type spring is also capable of sliding piston member 48 upwardly when annular chamber 46 is depressurized. A locking mechanism 52 is attached to the bottom of piston member 48 and provides a means by which piston member 48 and activating cylinder 14 may be locked to the notches on rod 12. Locking mechanism 52 comprises a first member 54 attached to the bottom end of piston member 48 and a second member 56 pivotally attached to first member 54 by means of screw 58 and second spring 60 which may be a torsion spring. First member 54 has a first hole 62 therein that is larger than any portion of rod 12 so that rod 12 may easily pas therethrough while second member 56 has a crescent-shaped hole 64 that has a diameter that is slightly larger than the notches on rod 12. As rod 12 is moved relative to second member 56, second member 56 contacts the camming surfaces 20 of rod 12 along the crescent-shaped hole 64 and causes second member 56 to be pivoted away from rod 12 so that rod 12 may pass through first hole 62. Once rod 12 has passed through first hole 62 and once second member 56 has reached the top of the camming surface 20, second spring 60 causes second member 56 to be pivoted toward rod 12 so that crescent-shaped portion of second member 56 engages one of the notches on rod 12 thereby holding rod 12 in place.

OPERATION

Tube type heat exchangers generally comprise a tubesheet 42 through which are disposed a plurality of heat exchange tubes 66. When a tube 66 becomes defective such that it must be plugged, a mechanical device may be inserted into the end of the tube 66 so as to prevent fluid from entering it. Such a device can comprise a cylindrical plug 68 having one closed end and one open end and having an internal surface that is tapered. At the open end of plug 68, there can be provided internal threads 70. An expander 72 is disposed within plug 68 such that when expander 72 is moved toward the open end of plug 68, the tapered sides of expander 72 cause plug 68 to be expanded into contact with the inside surface of tube 66 thereby preventing fluid from entering tube 66. After a period of operation in this configuration, it is sometimes necessary to remove plug 68 so that plug 68 or tube 66 can be replaced or repaired.

Figure 4:
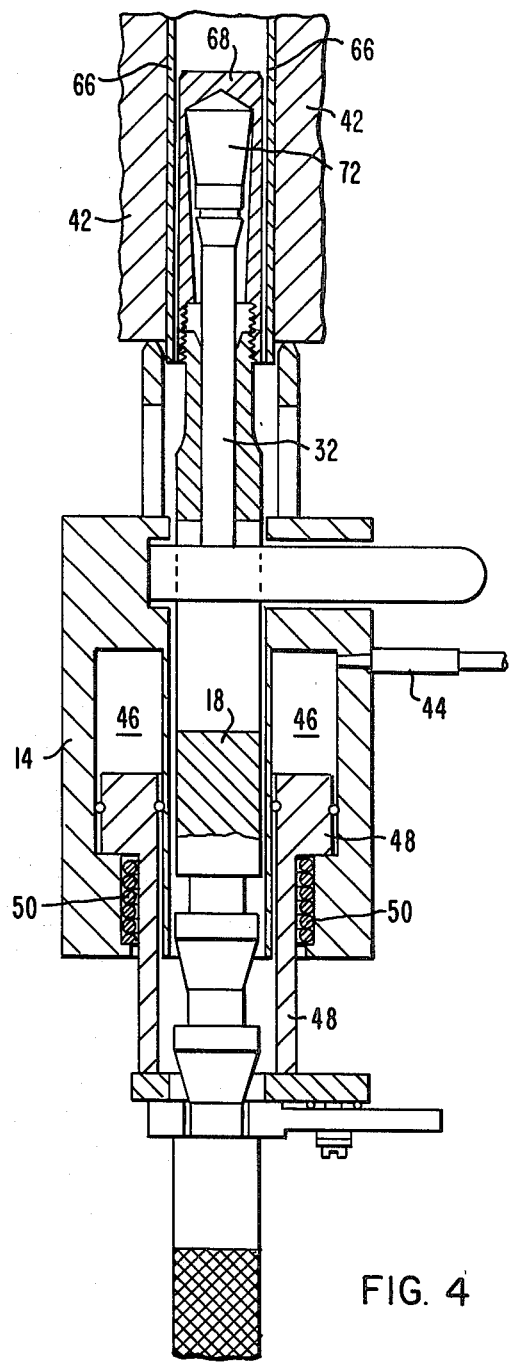
FIGS. 4-9 are cross-sectional views of the apparatus showing the various movements of the apparatus.

Referring now to FIG. 1, when it is desired to remove a particular plug 68, plug removal apparatus 10 may be either manually or remotely placed near the threaded end of plug 68. Next, first threads 30 of rod 12 are threaded into internal threads 70 of plug 68 as shown in FIG. 2. When in this configuration, bar 36 has been withdrawn from slot 18 as shown in FIG. 2 so that rod 12 is capable of free rotation for allowing it to be threaded into plug 68. The threading of rod 12 into plug 68 can be performed remotely or manually by turning handle 28 of rod 12. Once rod 12 has been threaded into internal threads 70 of plug 68, bar 36 is inserted into groove 38 as shown in FIG. 4. Next, a fluid such as oil is introduced into fluid line 44 and into annular chamber 46 which fills annular chamber 46 to a pressure of between 3,000 to 7,500 psi and causes activating cylinder 14 to be moved upwardly relative to rod 12 as shown in FIG. 4. As activating cylinder 14 is moved upwardly, first spring 50 is compressed and spacer 40 is caused to touch tubesheet 42. Since bar 36 has been inserted into groove 38, the upward movement of activating cylinder 14 causes bar 36 to contact the bottom end of ram 32 which causes ram 32 to slide upwardly through bore 16 and into contact with expander 72. When spacer 40 has contacted tubesheet 42, ram 32 has traveled its maximum vertical distance and has unseated expander 72 as shown in FIG. 4. The action of ram 32 in pushing expander 72 into the larger portion of plug 68 causes plug 68 to be loosened from tight contact with the internal surface of tube 66. Although when in this configuration plug 68 is no longer in tight contact with the internal surface of tube 66, nevertheless, plug 68 remains in contact with tube 66.

Figure 5:
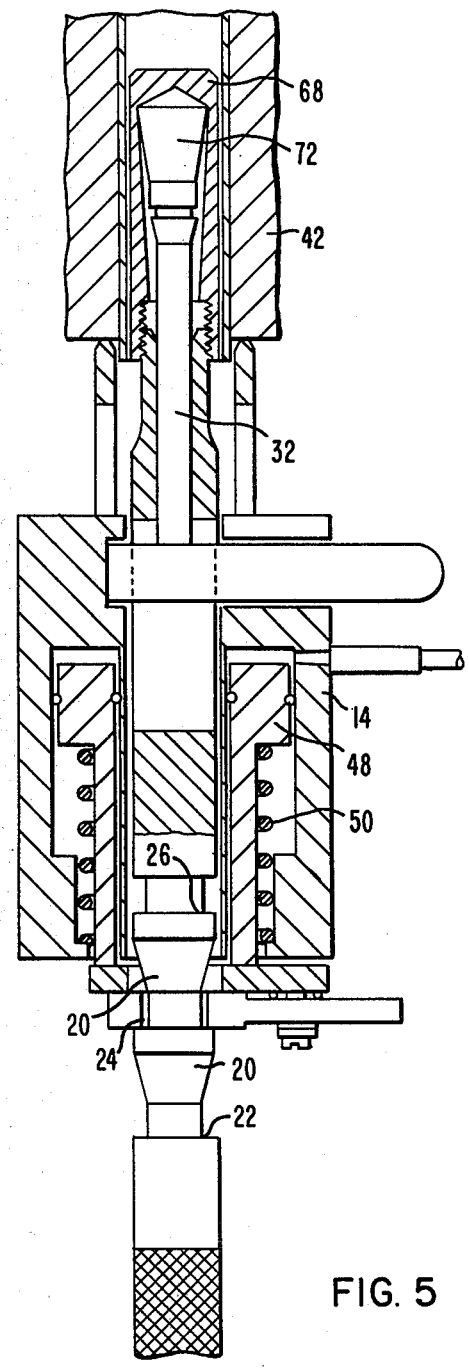

Referring now to FIG. 5, once plug 68 has thus been loosened, pressure is released from fluid line 44 which causes the fluid in annular chamber 46 to be pumped out of annular chamber 46 under the action of first spring 50. Since the fluid in annular chamber 46 is no longer under high pressure, first spring 50 is capable of sliding piston member 48 upwardly thus pushing the fluid in annular chamber 46 out through fluid line 44. This action is also possible because spacer 40 is in contact with tubesheet 42 thus preventing upward movement of activating cylinder 14. As piston member 48 is moved upward relative to rod 12, second member 56 contacts the first camming surface 20 and is pivoted away from rod 12 until second member 56 reaches the top end of first camming surface 20. At this point, second spring 60 causes second member 56 to be pivoted toward rod 12 such that crescent-shaped hole 64 contacts second notch 24 as shown in FIG. 5.

Figure 6:
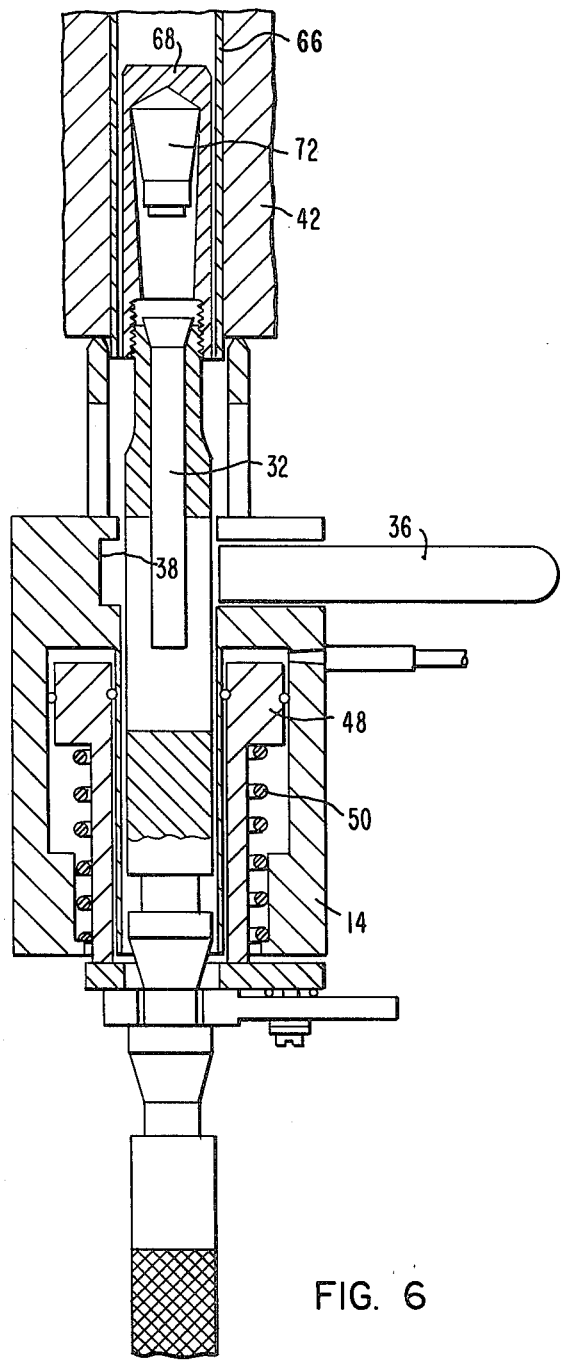
Figure 7:
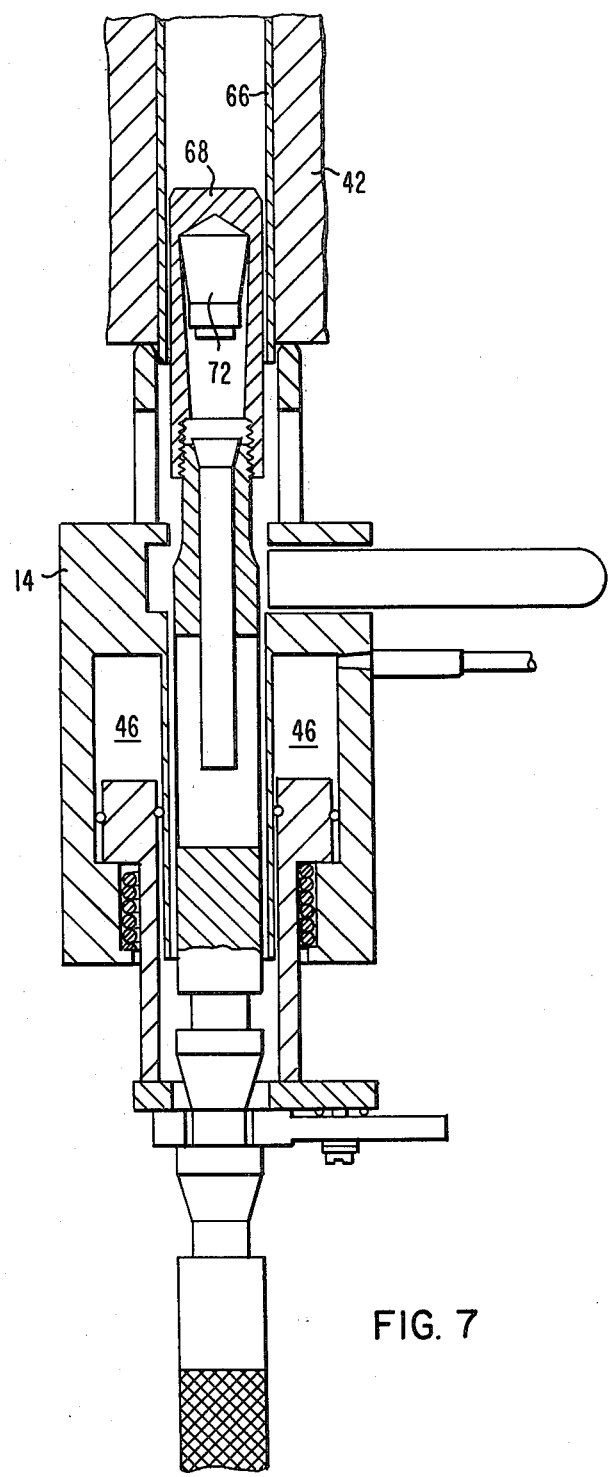

At this point, plug 68 must be pulled from tube 66. Bar 36 is then withdrawn from groove 38 as shown in FIG. 6. Next, fluid is again introduced through fluid line 44 and into annular chamber 46 so as to move piston member 48 downwardly relative to rod 12. The action of piston member 48 moving downwardly relative to rod 12 causes first spring 50 to be compressed as shown in FIG. 7. Since spacer 40 is contacting tubesheet 42, the action of piston member 48 moving downwardly relative to activating cylinder 14 and rod 12 causes second member 56 to contact the top of first camming surface 20 and causes rod 12 to be moved downwardly relative to tubesheet 42 and activating cylinder 14 as shown in FIG. 7. This action causes rod 12 to be moved downwardly and since rod 12 is attached to plug 68, plug 68 is also moved downwardly relative to tube 66. It is possible to design plug removal apparatus 10 such that this action causes plug 68 to be completely removed from tube 66. However, in order to completely remove plug 68 from tube 66 with a single stroke of rod 12, would require a relatively long stroke of rod 12. Since many applications of plug removal apparatus 10 are performed in areas having limited access, several short strokes of rod 12 may be preferred to a single long stroke for removing plug 68 from tube 66.

Figure 8:
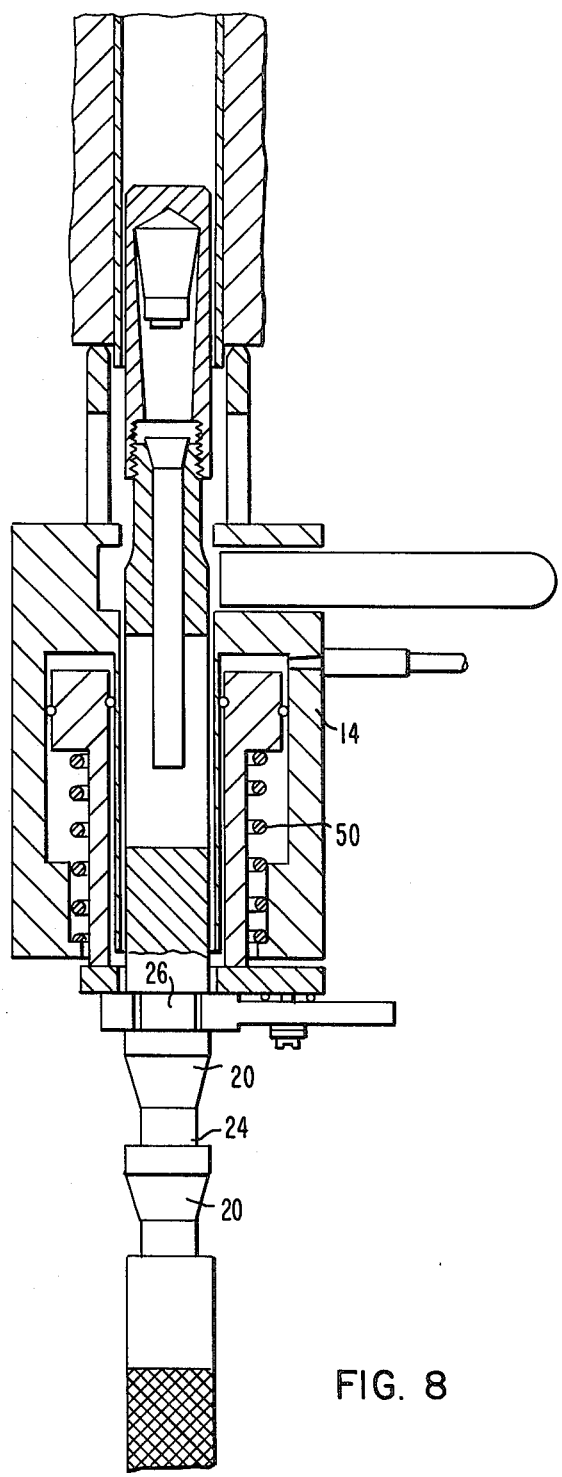

Referring now to FIG. 8, fluid line 44 is again depressurized which allows the fluid in annular chamber 46 to be removed therefrom under the action of first spring 50 and piston member 48. As first spring 50 causes piston member 48 to move upwardly relative to activating cylinder 14, second member 56 is caused to be pivotted on the second camming surface 20 until second member 56 reaches third notch 26 as shown in FIG. 8. When in this configuration, plug removal apparatus 10 is then capable of another stroke for removing plug 68.

Figure 9:
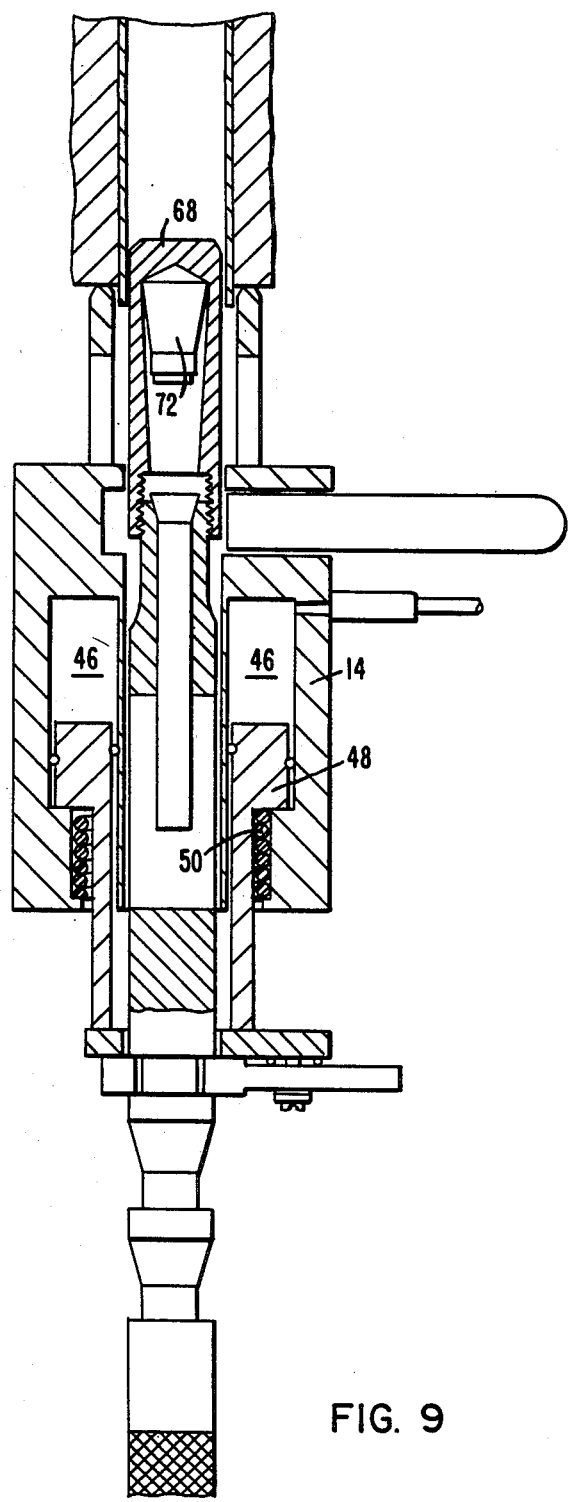

Annular chamber 46 is again pressurized which causes piston member 48 to be moved downward relative to activating cylinder 14 and which causes second member 56 to contact the top portion of the second camming surface 20 thus pushing rod 12 downwardly relative to tube 66. This stroke of rod 12 completely removes plug 68 from tube 66 as shown in FIG. 9. Thus, plug 68 can be removed from tube 66 using plug removal apparatus 10. Plug removal apparatus 10 can then be used to remove similar plugs from various tubes 66 of tubesheet 42.

Therefore, the invention provides plug removal apparatus for manually or remotely removing plugs from heat exchange tubes. Moreover, plug removal apparatus 10 is particularly suited for removing plugs from heat exchange tubes of nuclear steam generators wherein the radiation of the nuclear steam generator requires quick and efficient plug removal operations.

We claim as our invention:

1. Plug removal apparatus comprising:
   a fluid cylinder;
   a rod having a slot therethrough and disposed in said fluid cylinder for engaging a plug disposed in a member and extracting said plug from said member under the action of said fluid cylinder;
   a ram slidably disposed in said rod for loosening said plug in said member so that said plug can be extracted from said member; and
   engagement means associated with said rod and said fluid cylinder, with said slot selectively coupling said rod to said fluid cylinder, and for selectively engaging said ram thereby allowing said ram to loosen said plug when said fluid cylinder is activated.

2. The apparatus according to claim 1 wherein said apparatus further comprises locking means attached to said fluid cylinder and capable of contacting said rod for holding said rod in series of predetermined positions with respect to said fluid cylinder.

3. The apparatus according to claim 2 wherein said fluid cylinder comprises:
   an outer housing having a spacer on the top end thereof through which said rod is disposed and having an opening therein for accommodating said engagement means;
   a piston member slidably disposed in said outer housing and disposed around said rod with said locking means being attached thereto for moving said rod relative to said member; and
   biasing means disposed between said piston member and said outer housing for moving said piston member in response to fluid pressure changes in said fluid cylinder.

4. The apparatus according to claim 3 wherein said rod has a plurality of notches thereon with at least one camming surface located between said notches for providing a mechanism to interact with said locking means for moving and holding said rod relative to said member.

5. The apparatus according to claim 4 wherein said rod has threads on one end thereof for engaging said plug.

6. The apparatus according to claim 5 wherein said engagement means comprises a bar slidably disposed in said opening in said outer housing and capable of sliding through said slot in said rod for contacting said ram when said fluid cylinder is activated.

7. The apparatus according to claim 6 wherein said fluid cylinder further comprises means for introducing a fluid under pressure for moving said piston member relative to said outer housing.

8. The apparatus according to claim 7 wherein said biasing means is a spring.

* * * * *